US011275437B2

(12) United States Patent
Klingström et al.

(10) Patent No.: US 11,275,437 B2
(45) Date of Patent: Mar. 15, 2022

(54) EYE TRACKING APPLICATIONS IN VIRTUAL REALITY AND AUGMENTED REALITY

(71) Applicant: Tobii AB, Danderyd (SE)

(72) Inventors: Andreas Klingström, Danderyd (SE); Per Fogelström, Danderyd (SE); Andrew Ratcliff, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/073,836

(22) Filed: Oct. 19, 2020

(65) Prior Publication Data

US 2021/0034152 A1 Feb. 4, 2021

Related U.S. Application Data

(63) Continuation of application No. 16/220,760, filed on Dec. 14, 2018, now Pat. No. 10,809,800.

(60) Provisional application No. 62/678,539, filed on May 31, 2018.

(51) Int. Cl.
*G02B 27/00* (2006.01)
*G02B 27/01* (2006.01)
*G06F 3/01* (2006.01)

(52) U.S. Cl.
CPC .......... *G06F 3/013* (2013.01); *G02B 27/0093* (2013.01); *G02B 27/017* (2013.01); *G02B 27/0179* (2013.01); *G02B 2027/0187* (2013.01)

(58) Field of Classification Search
CPC ..... G06F 3/013; G06F 3/011; G02B 27/0093; G02B 27/017; G02B 27/0179; G02B 2027/0187; A61B 3/113; A61B 3/11
See application file for complete search history.

(56) References Cited

U.S. PATENT DOCUMENTS

| | | | | |
|---|---|---|---|---|
| 5,574,836 A * | 11/1996 | Broemmelsiek | ........ | G06F 3/012 345/427 |
| 5,966,680 A * | 10/1999 | Butnaru | ................ | A61M 21/00 702/150 |
| 6,577,249 B1 * | 6/2003 | Akatsuka | ............. | G06K 9/3216 340/988 |
| 6,932,090 B1 * | 8/2005 | Reschke | ............... | A61M 21/00 128/897 |
| 8,708,884 B1 * | 4/2014 | Smyth | ................... | A61M 21/00 600/27 |
| 8,892,252 B1 * | 11/2014 | Troy | ...................... | G01B 11/14 700/245 |
| 9,080,868 B2 * | 7/2015 | Krueger | ................... | G01C 9/20 |
| 9,600,939 B1 * | 3/2017 | Kormandel | ............. | G06T 11/60 |
| 9,829,976 B2 * | 11/2017 | Algotsson | ........... | G06F 3/04815 |

(Continued)

*Primary Examiner* — Ricardo Osorio
(74) *Attorney, Agent, or Firm* — Samuel I. Yamron

(57) ABSTRACT

A method and a corresponding apparatus for mitigating motion sickness in a virtual reality VR/augmented reality (AR) system using a head mounted display (HMD) are disclosed. The method comprises receiving data from a sensor indicating a current orientation of the HMD in real space, and superimposing a visual indication on a display of the HMD. The visual indication provides visual information to a user of the current orientation of the HMD in real space. Furthermore, methods and corresponding apparatuses are disclosed of calculating gaze convergence distance in an eye tracking system, and of gaze based virtual reality (VR)/ augmented reality (AR) menu expansion.

12 Claims, 6 Drawing Sheets

(56) References Cited

U.S. PATENT DOCUMENTS

| | | | | |
|---|---|---|---|---|
| 9,870,051 | B2* | 1/2018 | Lovtjarn | G06F 16/434 |
| 9,994,228 | B2* | 6/2018 | Krueger | A61B 5/7445 |
| 2012/0293325 | A1* | 11/2012 | Lahcanski | G06F 3/013 |
| | | | | 340/539.13 |
| 2014/0361971 | A1* | 12/2014 | Sala | G06F 3/041 |
| | | | | 345/156 |
| 2015/0273179 | A1* | 10/2015 | Krueger | G01C 9/12 |
| | | | | 600/27 |
| 2016/0077337 | A1* | 3/2016 | Raffle | G02B 27/017 |
| | | | | 345/156 |
| 2017/0053557 | A1* | 2/2017 | Daniel | G09B 19/24 |
| 2017/0228139 | A1* | 8/2017 | Goslin | G06F 3/017 |
| 2018/0123813 | A1* | 5/2018 | Milevski | H04L 12/1827 |
| 2018/0252922 | A1* | 9/2018 | Fujimaki | A63F 13/212 |
| 2018/0365804 | A1* | 12/2018 | Rikoski | G09G 5/003 |
| 2020/0121544 | A1* | 4/2020 | George | A61H 9/0071 |

* cited by examiner

EYE TRACKING APPLICATIONS IN VIRTUAL REALITY AND AUGMENTED REALITY

CROSS-REFERENCE TO RELATED APPLICATION

The present application claims benefit to U.S. patent application Ser. No. 16/220,70, filed Dec. 14, 2018, entitled "Robust Convergence Signal", which claims to 62/678,539, filed on May 31, 2018, to Klingström et al., entitled "EYE TRACKING APPLICATIONS IN VIRTUAL REALITY AND AUGMENTED REALITY", and is hereby incorporated by reference in its entirety.

BACKGROUND

Motion Sickness Mitigation

In virtual reality (VR) and augmented reality (AR) applications, problems may arise for users in applications with visual and/or physical motion in virtual and/or real space in that such motion may cause motion sickness.

It would be desirable to provide an VR/AR technology that reduces motion sickness in relation to the known methods.

Robust Convergence Signal

In virtual reality (VR) and augmented reality (AR) applications, a gaze convergence distance is an important input from an eye tracking system.

When calculating a gaze convergence distance in known eye tracking systems, a gaze vector from a right eye and a gaze vector from a left eye are calculated and the intersection between these vectors is used to determine the convergence distance. Problems arise with this way of calculating convergence distance in that the gaze vectors in relation to the eyes both include noise and a small angle errors in the gaze vectors will result in a large error in the gaze convergence distance.

It would be desirable to provide an eye tracking technology that reduces the error in a calculated gaze convergence distance of the known methods.

Gaze Based Object Expansion

In virtual reality (VR) and augmented reality (AR) applications there are situations where access to visual menus or other objects is useful. Accessing the menus requires user input by means of user input means. In known systems such input means are often based on touch control or other pointer based input means using hands, arms or the like to control buttons or perform gestures to access the menus. Other examples of known systems use voice control or gaze dwelling to activate menus. A problem with such input means is that some of them is that they may require combination of actions and/or actions conflicting or at least being difficult to combine with other actions performed.

It would be desirable to provide a virtual reality and an augmented reality technology with alternative solutions of activating and viewing menus or other objects in relation to the known methods and systems. Preferably, the technology should be simplified and/or more intuitive.

SUMMARY

The present disclosure generally relates to the field of eye tracking. In particular, the present disclosure relates to systems and methods for use in identifying reflections from optical arrangements in an eye tracking system.

Motion Sickness Mitigation

Real world motion sickness generally occurs when a person's eyes are providing conflicting signals about motion and orientation from the signals provided by vestibular sensors in the inner ear. In real life, for example keeping an eye on the horizon while traveling on a boat or looking at the road ahead while riding in a car are proven methods of relieving motion sickness symptoms.

In AR and VR, finding such 'horizon' is not feasible in every scene image, wherein the scene image is displayed on a display device of AR/VR HMD. In order to mitigate VR/AR user's motion sickness a method for mitigating motion sickness according to the independent claims is provided. Further embodiments are provided according to the dependent claims.

It is proposed to superimpose a visual indication that provides visual information to a user of the current orientation of the HMD in real space, the visual information comprising for example a grid-like (or other pattern) image with specific size and shape and at least surrounding a foveated region based on relative movement between a motion (detected by gyro and/or accelerometer) of HMD and characteristics of a scene image.

According to a first aspect, there is provided a method for mitigating motion sickness in a system using a head mounted display (HMD) for VR or AR. In the method, data are received from a sensor indicating a current orientation of the HMD in real space. A visual indication is then superimposed on a display of the HMD, which visual indication provides visual information to a user of the current orientation of the HMD in real space.

In some embodiments, data from a gaze tracking function are received indicating current gaze point of the user. Furthermore, the visual indication may then comprise an occlusion region including the current gaze point of the user such that the visual indication is not disclosed in the occlusion region.

The occlusion region can be introduced around a current gaze point to avoid the visual indication obscuring what the user is currently looking at. The occlusion region preferably at least substantially matches the fovea part of the retina of the user's eye which is the portion of the retina that provides the clearest vision.

The size of the occlusion region is generally a tradeoff between the efficiency of mitigating motion sickness and limiting distraction to the user. Reducing the size of the occlusion region will generally increase the efficiency of mitigating motion sickness and at the same time increase the distraction of the user since the visual indication used is generally introduced to orient the user's visual perception in relation to horizontal and vertical direction in relation to real space.

Furthermore, the level of transparency (opacity) of the visual indication, or in other words how much the visual indication covers or obscures other visual information in the user's view, is also generally a tradeoff between the efficiency of mitigating motion sickness and limiting distraction to the user. Reducing the level of transparency of the occlusion region will generally increase the efficiency of mitigating motion sickness but at the same time increase the distraction of the user since the visual indication used is generally only introduced to orient the user's visual perception in relation to horizontal and vertical direction in relation to real space.

In some embodiments, the visual indication has a higher degree of transparency in a region closest to the occlusion region than in regions further away from the occlusion region. Hence, just outside the occlusion region, the visual indication will be more transparent, or in other words the visual indication will cover or obscure other visual information in the user's view less, than further away from the occlusion region. For example, the degree of transparency can gradually decrease as a function of distance from the occlusion region in a region just outside the occlusion region. This will reduce the distraction of the user in relation to having a sharp edge at the border of the occlusion region, e.g. going from occluded visual indication in the occlusion region to non-transparent visual indication just outside the occlusion region, as sharp edges tend to be more distracting to a user than softer transitions.

In some embodiments an angle difference between a vertical direction of the HMD in real space and a vertical direction of the user's visual impressions is measured over a period of time and the largest angle difference during the period of time is determined. On condition that the determined largest angle difference is larger than a predetermined threshold value, the size of the occlusion region is decreased.

A vertical direction of the HMD in real space will generally be a vertical direction of the user's head in real space and will be sensed by the vestibular sensors in the inner ear of the user. A vertical direction of the user's visual impression is based on visual cues identified in the user's brain. The visual cues are used to make guesses as to what is believed (interpreted) to be fixed to ground and hence what is vertical and what is horizontal. For example, a large floor (or deck of a boat) would be a good guess or the side of a large building. This is what determines the visual spatial context.

Even though reference is made to vertical direction of the HMD in real space and vertical direction of the user's visual impressions hereinabove, any reference directions (3D vectors) in the two spatial contexts (visual and inner ear context) and relative angular change or directional change over time between the reference directions value could be used together with a predetermined threshold value for determining if further measures for mitigating motion sickness should be applied, such as decreasing the size of the occlusion region.

As indicated, the size of the occlusion region is generally a tradeoff between the efficiency of mitigating motion sickness and limiting distraction to the user. For situations where the risk for motion sickness becomes larger, deciding on the tradeoff between reducing motion sickness and limiting distraction for the user may result in a desire to increase the mitigation of motion sickness, e.g. by reducing the size of the occlusion region.

As indicated, the level of transparency of the visual indication is also generally a tradeoff between the efficiency of mitigating motion sickness and limiting distraction to the user. For situations where the risk for motion sickness becomes larger, deciding on the tradeoff between reducing motion sickness and limiting distraction for the user may result in deciding to increase the mitigation of motion sickness, e.g. by decreasing the transparency of the visual indication.

The risk for motion sickness may for example be higher if a user is using a HMD on a boat and the boat is rocking much, e.g. such that an angle between the vertical direction of the HMD in real space and the vertical direction of the user's visual impressions becomes larger than the predetermined threshold value over a period of time. In such cases the size of the occlusion region may be reduced. In alternative or in addition to reducing the size of the occlusion region, the transparency of the visual indication can be reduced.

The risk for motion sickness may for example be higher also if a user is using a HMD for VR where the vertical direction of the user's visual impressions changes much without the vertical direction of the HMD in real space does not change, such that an angle between the vertical direction of the HMD in real space and the vertical direction of the user's visual impressions becomes larger than the predetermined threshold value over a period of time.

Other situations where the risk for motion sickness may be higher can be identified by means of measuring other parameters than the angle between the vertical direction of the HMD in real space and the vertical direction of the user's visual impressions. For such situations threshold values for the measured other parameters are determined and the size of the occlusion region is set in relation to the other parameters.

The visual indication is generally introduced to orient the user's visual perception in relation to horizontal and vertical direction in relation to real space. One way of doing this is if the visual indication indicates a surface which is held horizontal in relation to real space. The surface is superimposed in the user's view. The surface may for example be a grid like pattern.

In addition to being horizontal in relation to real space, i.e. indicating a horizontal direction in relation to real space in the user's view, the visual indication may indicate perspective in relation to a virtual horizon simulating the real space horizon and being horizontal in relation to real space.

The visual indication may also comprise an augmented horizontal line.

According to a second aspect, there is provided an apparatus for mitigating motion sickness in a system using a head mounted display (HMD) for VR or AR. The apparatus comprises a receiver for receiving data from a sensor indicating a current orientation of the HMD in real space. The apparatus further comprises processing circuitry for superimposing a visual indication on a display of the HMD. The visual indication provides visual information to a user of the current orientation of the HMD in real space.

In some embodiments, the receiver is further for receiving data from a gaze tracking function indicating current gaze point of the user. Furthermore, the visual indication comprises an occlusion region including the current gaze point of the user, such that the visual indication is not disclosed in the occlusion region.

According to a third aspect, there is provided an apparatus comprising circuitry configured to perform any the method of the first aspect.

Embodiments of the apparatus according to the third aspect may for example include features corresponding to the features of any of the embodiments of the method according to the first aspect.

According to a fourth aspect, there is provided one or more computer-readable storage media storing computer-executable instructions that, when executed by an apparatus, cause the apparatus to perform the method of the first aspect.

Embodiments of the one or more computer-readable storage media according to the fourth aspect may for example include features corresponding to the features of any of the embodiments of the method according to the first aspect.

The one or more computer-readable media may for example be one or more non-transitory computer-readable media.

Robust Convergence Signal

According to a fifth aspect, a method of calculating gaze convergence distance in an eye tracking system is provided. In the method, a first image is received of a left eye and a right eye of a user when the user is focusing at a first known depth of field. A pupil of the left eye and a pupil of the right eye are identified in the first image and a pupil position of the left eye and a pupil position of the right eye are determined in the first image. A first interpupillary distance in the first image between the pupil position of the left eye in the first image and the pupil position of the right eye in the first image is calculated. A second image is received of the left eye and the right eye of the user when the user is focusing at a second known depth of field. The pupil of the left eye and the pupil of the right eye are identified in the second image and a pupil position of the left eye and the pupil position of the right eye are determined in the second image. A second interpupillary distance in the second image between the pupil position of the left eye in the second image and the pupil position of the right eye in the second image is calculated. The depth of field, i.e. the gaze convergence distance, is defined as a linear function of the interpupillary distance based on the first depth of field and first interpupillary distance together with the second depth of field and the second interpupillary distance.

After defining the gaze convergence distance as a linear function of the interpupillary distance, a gaze convergence distance can be determined from a received third image of the left eye and the right eye of the user when the user is focusing at a third unknown depth of field by identifying the pupil of the left eye in the third image and the pupil of the right eye are in the third image and determining a pupil position of the left eye in the third image and the pupil position of the right eye in the first image. An interpupillary distance in the third image between the pupil position of the left eye in the third image and the pupil position of the right eye in the third image is then calculated and the gaze convergence distance is determined from the defined linear function.

According to a sixth aspect, there is provided an apparatus comprising circuitry configured to perform the method of the fifth aspect.

Embodiments of the apparatus according to the sixth aspect may for example include features corresponding to the features of any of the embodiments of the method according to the fifth aspect.

According to a seventh aspect, there is provided one or more computer-readable storage media storing computer-executable instructions that, when executed by an apparatus, cause the apparatus to perform the method of the fifth aspect.

Embodiments of the one or more computer-readable storage media according to the seventh aspect may for example include features corresponding to the features of any of the embodiments of the method according to the fifth aspect.

The one or more computer-readable media of the seventh aspect may for example be one or more non-transitory computer-readable media.

Gaze Based Object Expansion

According to an eighth aspect, there is provided a method of gaze based virtual reality (VR) menu expansion. In the method a menu is provided in VR such that only a portion of the menu is visible outside a center region of a user's view. The portion of the menu is fixed in VR space in relation to the user's head. On condition that the user's gaze is directed to the portion of the menu, the menu is made fixed (pinned) in relation to real space such that when the users head is moved in a direction of previously not visible portions of the menu, such previously not visible portions of the menu will become visible.

When the complete menu is visible, the complete menu may be made fixed (pinned) in relation to the user's head. On condition that the user's gaze is directed away from the menu, the view returns to only a portion of the menu being visible outside the center region of a user's view.

According to a ninth aspect, there is provided an apparatus comprising circuitry configured to perform the method of the eighth aspect.

Embodiments of the apparatus according to the ninth aspect may for example include features corresponding to the features of any of the variations of the method according to the eighth aspect.

According to a tenth aspect, there is provided one or more computer-readable storage media storing computer-executable instructions that, when executed by an apparatus, cause the apparatus to perform the method of the eighth aspect.

Embodiments of the one or more computer-readable storage media according to the tenth aspect may for example include features corresponding to the features of any of the embodiments of the method according to the eighth aspect.

The one or more computer-readable media of the tenth aspect may for example be one or more non-transitory computer-readable media.

According to an eleventh aspect, there is provided a method of gaze based augmented reality (AR) menu expansion. In the method menu is provided in AR such that only a portion of the menu is visible outside a center region of a user's view. The portion of the menu is fixed in a virtual space in relation to the user's head. On condition that the user's gaze is directed to the portion of the menu, the menu is made fixed (pinned) in the virtual space in relation to real space such that when the users head is moved in a direction of previously not visible portions of the menu, such previously not visible portions of the menu will become visible.

The method may further include that when the complete menu is visible, the complete menu is made fixed in relation to the user's head. The menu may then be fixed in relation to the user's head as long as the user's gaze is directed to the menu. On condition that the user's gaze is directed away from the menu, the view returns to only a portion of the menu being visible outside the center region of a user's view.

According to a twelfth aspect, there is provided an apparatus comprising circuitry configured to perform the method of the eleventh aspect.

Embodiments of the apparatus according to the twelfth aspect may for example include features corresponding to the features of any of the embodiments of the method according to the eleventh aspect.

According to a thirteenth aspect, there is provided one or more computer-readable storage media storing computer-executable instructions that, when executed by an apparatus, cause the apparatus to perform the method of the eleventh aspect.

Embodiments of the one or more computer-readable storage media according to the thirteenth aspect may for example include features corresponding to the features of any of the embodiments of the method according to the eleventh aspect.

The one or more computer-readable media of the thirteenth aspect may for example be one or more non-transitory computer-readable media.

BRIEF DESCRIPTION OF THE DRAWINGS

This and other aspects will now be described in more detail in the following illustrative and non-limiting detailed description, with reference to the appended drawings.

All the figures are schematic, not necessarily to scale, and generally only show parts which are necessary in order to elucidate the respective example, whereas other parts may be omitted or merely suggested.

DETAILED DESCRIPTION

Motion Sickness Mitigation

Figure 1A:
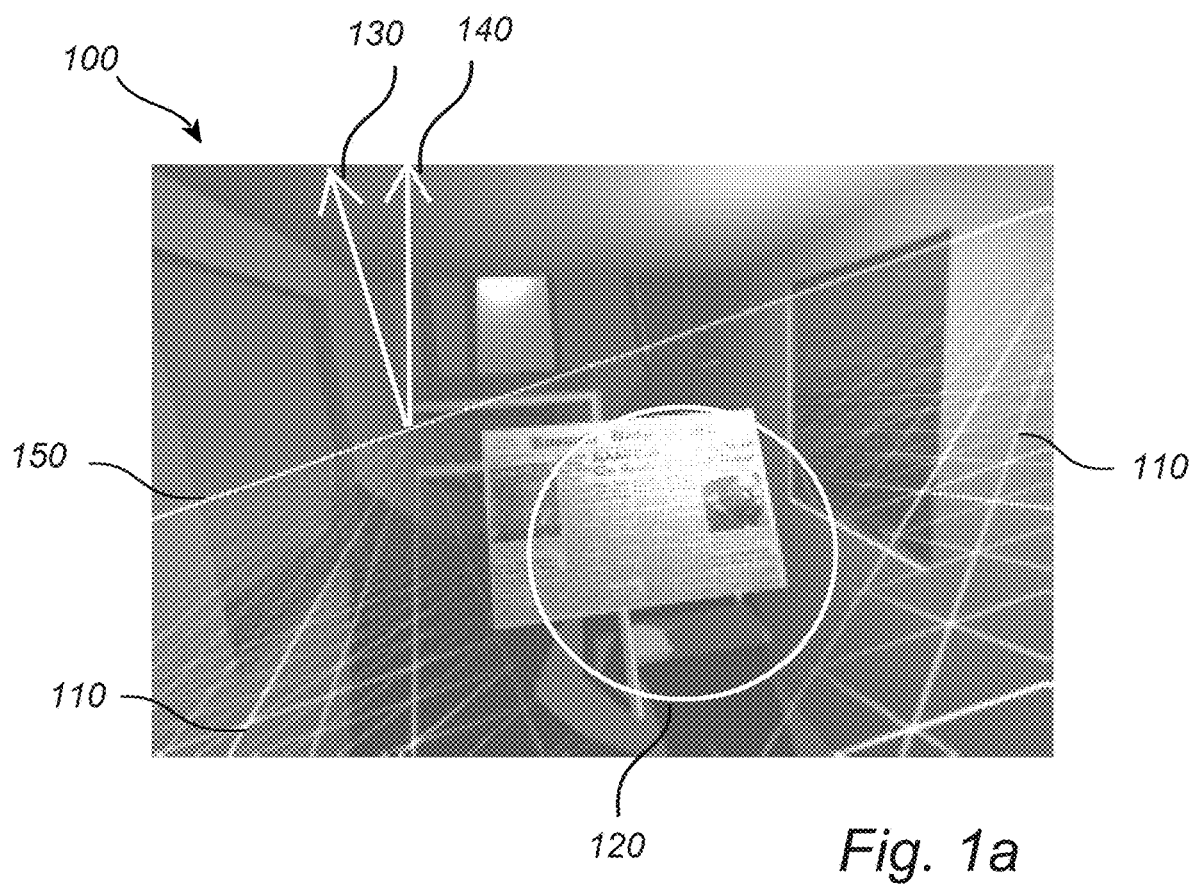
FIG. 1a shows a schematic view of an example of visual indication in a VR view.

FIG. 1a shows a schematic view of an example of visual indication in a virtual reality (VR) view 100 in a system using a head mounted display (HMD) including an eye/gaze tracking function. In the VR view 100 a visual indication comprising a grid 110 has been superimposed over the VR view 100. The eye/gaze tracking function provides information regarding a current gaze point of the user of the HMD. An occlusion region 120 indicated by a circle 120 is provided in the VR view 100. Within the occlusion region 120 the grid 110 is completely transparent and just outside the occlusion region, the transparency of the grid 110 is gradually reduced. The circle 120 is generally not shown in the view in the HMD but is included in the VR view 100 in FIG. 1 for illustrative purposes. A sensor (not shown) provides information regarding the orientation of the HMD in real space, e.g. an angle in relation to a horizontal direction of real space indicated in the image as an arrow 130. The sensor may for example be a gyro and/or accelerometer. In addition to the arrow 130 indicating horizontal direction of real space, an arrow 140 is shown indicating horizontal direction as experienced visually by a user of the HMD. The arrows 130, 140 are generally not shown in the view in the HMD but are included in the VR view 100 of FIG. 1 for illustrative purposes. In addition to the grid 110, the visual indication comprises an augmented horizontal line 150.

The grid 110 and the augmented horizontal line 150 provide visual information to a user of the current orientation of the HMD in real space by generally indicating a surface which is horizontal in relation to real space.

It is to be noted that it is indicated that the grid 110 is transparent in different degrees outside the occlusion region 120. This is intended to mean that the lines of the grid itself are transparent. The grid in itself is in another aspect transparent in relation to the background since it is comprised of grid lines and together indicating a surface and between the grid lines the VR view is visible without being covered to any extent of the grid.

It is further also to be noted that the transparency of the grid lines is further made more transparent closer to the augmented horizontal line 150. This is a different feature than the transparency of the grid lines just outside the occlusion region.

Real world motion sickness generally occurs when a person's eyes are providing conflicting signals regarding motion and orientation from the signals provided by vestibular sensors in the inner ear. In real life, for example keeping an eye on the horizon while traveling on a boat or looking at the road ahead while riding in a car are proven methods of relieving motion sickness symptoms.

In AR and VR usage, finding such 'horizon' may not be feasible in every scene. The grid 110 and the augmented horizontal line 150 are included in order to mitigate VR/AR user's motion sickness.

The occlusion region 120 can be introduced around a current gaze point to avoid the visual indication obscuring what the user is currently looking at. The occlusion region preferably at least substantially matches the fovea part of the retina of the user's eye which is the portion of the retina that provides the clearest vision. The occlusion region 120 is shown as circular in the view 100 of FIG. 1a but may have other shapes such as rectangular, oval etc.

The size of the occlusion region is generally a tradeoff between the efficiency of mitigating motion sickness and limiting distraction to the user. Reducing the size of the occlusion region will generally increase the efficiency of mitigating motion sickness and at the same time increase the distraction of the user since the visual indication used is generally introduced to orient the user's visual perception in relation to horizontal and vertical direction in relation to real space.

Furthermore, the level of transparency (opacity) of the visual indication, or in other words how much the visual indication covers or obscures other visual information in the user's view, is also generally a tradeoff between the efficiency of mitigating motion sickness and limiting distraction to the user. Reducing the level of transparency of the occlusion region will generally increase the efficiency of mitigating motion sickness and at the same time increase the distraction of the user since the visual indication used is generally only introduced to orient the user's visual perception in relation to horizontal and vertical direction in relation to real space.

Having a higher degree of transparency in a region closest outside the occlusion region than in regions further away from the occlusion region and gradually decrease as a function of distance from the occlusion region in a region just outside the occlusion region will reduce the distraction of the user in relation to an example with a sharp edge in terms of degree of transparency at the border of the occlusion region as sharp edges tend to be more distracting to a user than softer transitions.

The angle difference between the vertical direction of the HMD in real space indicated by arrow 130 and a vertical direction of the user's visual impressions indicated by arrow 140 is measured over a period of time and the largest angle difference during the period of time is determined. If the determined largest angle difference is larger than a predetermined threshold value, the size of the occlusion region is decreased.

In alternative to measuring only the largest angle difference during a period of time the size of the change of the angle difference may be measured and a largest angle change over a period of time may be determined. If the determined largest angle difference change is larger than a predetermined threshold value, the size of the occlusion region is decreased.

As indicated, the size of the occlusion region is generally a tradeoff between the efficiency of mitigating motion sickness and limiting distraction to the user. For situations where the risk for motion sickness becomes larger, deciding on the tradeoff between reducing motion sickness and limiting distraction for the user may result in a desire to increase the mitigation of motion sickness, e.g. by reducing the size of the occlusion region.

The risk for motion sickness may for example be higher if a user is using a HMD on a boat and the boat is rocking much, e.g. such that an angle (or a change of the angle) between the vertical direction of the HMD in real space and the vertical direction of the user's visual impressions becomes larger than the predetermined threshold value over a period of time. In such cases the size of the occlusion region may be reduced. In alternative or in addition to reducing the size of the occlusion region, the transparency of the visual indication can be reduced.

The risk for motion sickness may for example be higher also if a user is using a HMD for VR where the vertical direction of the user's visual impressions changes much without the vertical direction of the HMD in real space does not change, such that an angle between the vertical direction of the HMD in real space and the vertical direction of the user's visual impressions becomes larger than the predetermined threshold value over a period of time.

Other situations where the risk for motion sickness may be higher can be identified by means of measuring other parameters than the angle between the vertical direction of the HMD in real space and the vertical direction of the user's visual impressions. For such situations threshold values for the measured other parameters are determined and the size of the occlusion region is set in relation to the other parameters.

The visual indication is generally introduced to orient the user's visual perception in relation to horizontal and vertical direction in relation to real space. One way of doing this is if the visual indication comprises something that indicates a surface which is horizontal in relation to real space. The surface is superimposed in the user's view.

In addition to being horizontal in relation to real space, i.e. indicating a horizontal direction in relation to real space in the user's view, the visual indication may indicate perspective in relation to a virtual horizon simulating the real space horizon and being horizontal in relation to real space.

The visual indication may for example comprise a grid like pattern 110 and an augmented horizontal line. Generally, the more non-repetitive and high contrasting an indicated surface comprised in the visual indication is, the better. One pattern effective for mitigating motion sickness would for example be a newspaper print. However, it comes at the cost of being distracting.

FIG. 1*a* shows a view of a VR HMD system. However, the description hereinabove in relation to VR is equally applicable for AR HMD systems. For example, if a AR HMD system is used inside a vehicle such as a train, car or boat where the user cannot easily see out of the vehicle and hence not see a horizon etc, a visual indication can be superimposed on a display of the AR HMD over the other virtual objects and real life view of the user as is disclosed in relation VR hereinabove.

Figure 1B:
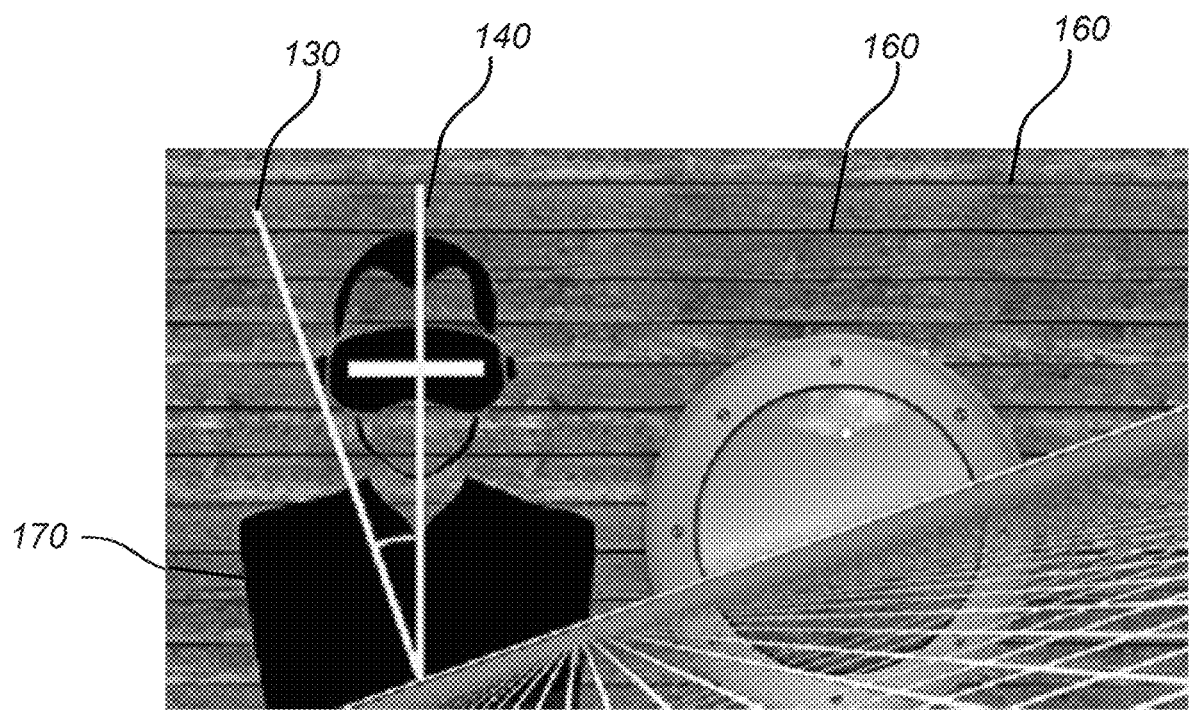
FIGS. 1b and 1c show schematic views of examples of a difference in angle between a vertical direction of a HMD (user's head) in real space and a vertical direction of a user's visual impressions.
Figure 1C:
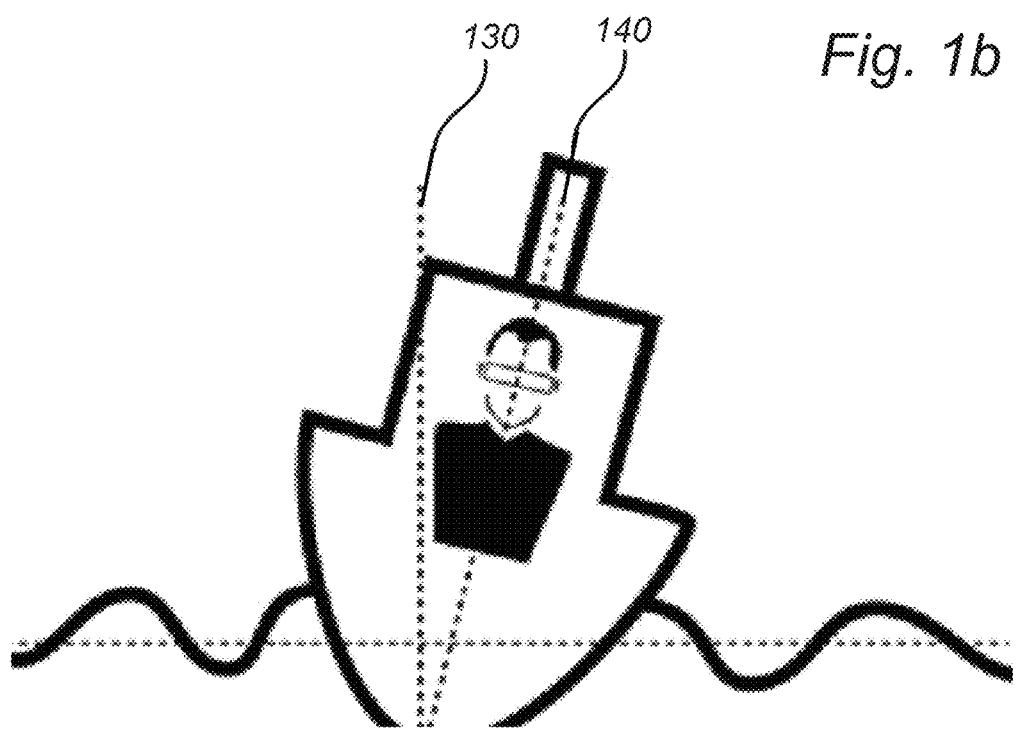

FIG. 1*b* and FIG. 1*c* show schematic views of examples of a difference in angle between a vertical direction 130 of a HMD (user's head) in real space and a vertical direction 140 of a user's visual impressions.

A vertical direction of the HMD in real space will generally be a vertical direction of the user's head in real space and will be sensed by the vestibular sensors in the inner ear of the user. A vertical direction of the user's visual impression is based on visual cues identified in the user's brain. The visual cues are used to make interpretations as to what is vertical and what is horizontal. For example, the parallel lines 160 on the wall behind the user 170 in FIG. 1*b* could be interpreted as being horizontal according to the user's visual impressions. Other examples are a large floor (or deck of a boat) or the side of a large building. This is what determines the visual spatial context.

Even though reference is made to vertical direction of the HMD in real space and vertical direction of the user's visual impressions hereinabove, any reference directions (3D vectors) in the two spatial contexts (visual and inner ear context) and relative angular change or directional change over time between the reference directions value could be used together with a predetermined threshold value for determining if further measures for mitigating motion sickness should be applied, such as decreasing the size of the occlusion region.

Figure 2:
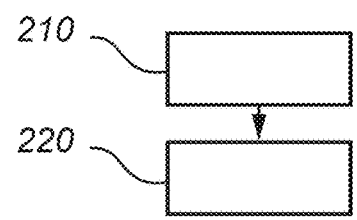
FIG. 2 is a flow chart of a method for mitigating motion sickness.

FIG. 2 is a flow chart of a method for mitigating motion sickness in a system using a head mounted display (HMD). In the method data are received 210 from a sensor indicating a current orientation of the HMD in real space. A visual indication is then superimposed 220 on a display of the HMD, which visual indication provides visual information to a user of the current orientation of the HMD in real space.

The method may further comprise receiving data from a gaze tracking function indicating current gaze position of the user. The visual indication may then comprise an occlusion region including the current gaze position of the user such that the visual indication is not disclosed in the occlusion region. The visual indication may have a higher degree of transparency in a region closest to the occlusion region than in regions further away from the occlusion region.

The method may further comprise measuring an angle difference between a vertical direction of the HMD in real space and a vertical direction of the user's visual impressions is measured over a period of time and the largest angle difference during the period of time is determined. If the determined largest angle difference is larger than a predetermined threshold value, the size of the occlusion region is decreased.

Figure 3:
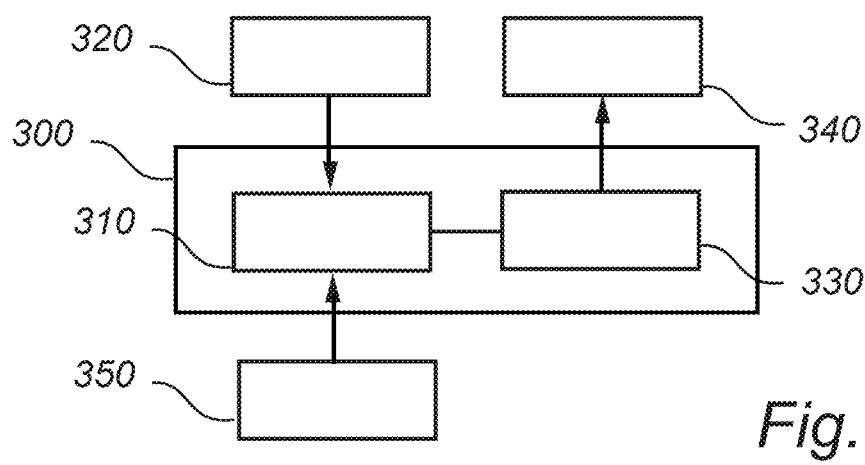
FIG. 3 is a schematic diagram of an apparatus for mitigating motion sickness.

FIG. 3 is a schematic diagram of an apparatus 300 for mitigating motion sickness in a system using a head mounted display (HMD) for VR or AR. The apparatus 300 comprises a receiver 310 for receiving data from a sensor 230 indicating a current orientation of the HMD in real space. The apparatus 300 further comprises processing circuitry 330 for superimposing a visual indication on a display 340 of the HMD. The visual indication provides visual information to a user of the current orientation of the HMD in real space.

The receiver further receives data from a gaze tracking circuitry 350 indicating current gaze position of the user. The visual indication may then comprise an occlusion region including the current gaze position of the user, such that the visual indication is transparent to a higher degree in the occlusion region than in other regions of the view outside the occlusion region.

Methods for mitigating motion sickness in a system using a head mounted display (HMD) as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media of the seventh aspect may for example be one or more non-transitory computer-readable media.

Robust Convergence Signal

Figure 4:
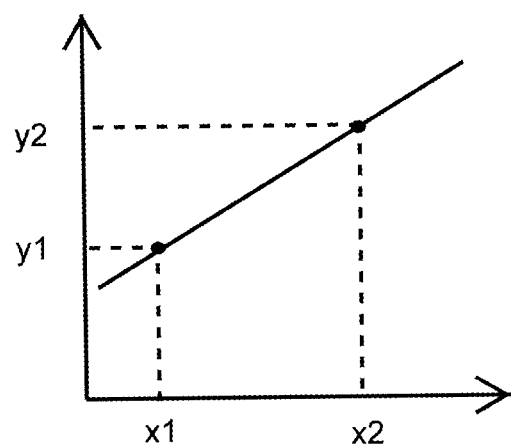
FIG. 4 is a diagram showing an example of a function for determining a gaze convergence distance based on pupillary distance.

FIG. 4 is a diagram showing an example of a function for determining a gaze convergence distance based on interpupillary distance in a virtual reality (VR) system or an augmented reality AR system including an eye/gaze tracking function. A first interpupillary distance x1 is determined when a user focuses on a first known depth of field y1, where the first known depth of field y1 is preferably short. A second interpupillary distance x2 is determined when a user focuses on a second known depth of field y2, where the second known depth of field y2 is preferably long. The difference between the second depth of field y2 and the first depth of field y1 is preferably large. The depth of field is then approximated as a linear function through the points (x1, y1) and (x2, y2).

Figure 5:
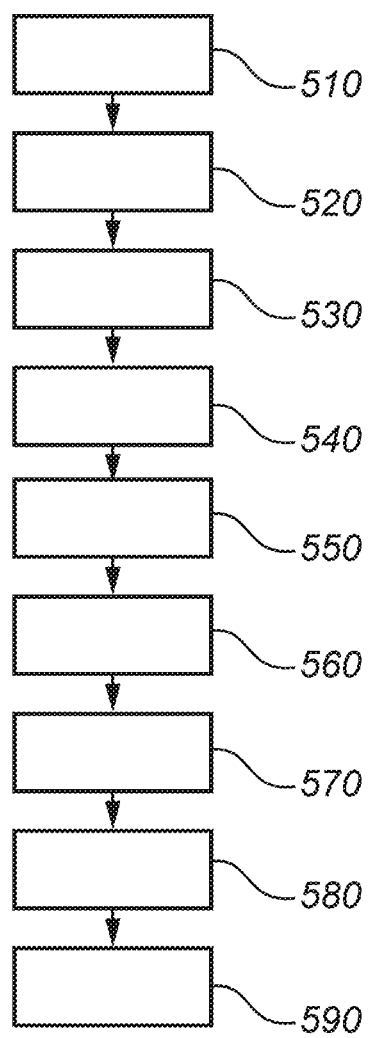
FIG. 5 is a flow chart of a method for determining a gaze convergence distance.

FIG. 5 is a flow chart of a method for determining a gaze convergence distance in a virtual reality (VR) system or an augmented reality AR system. A first image is received 510 of a left eye and a right eye of a user when the user is focusing at a first known depth of field. A pupil of the left eye and a pupil of the right eye are identified 520 in the first image and a pupil position of the left eye and a pupil position of the right eye are determined 530 in the first image. A first interpupillary distance in the first image between the pupil position of the left eye in the first image and the pupil position of the right eye in the first image is calculated 540. A second image is received 550 of the left eye and the right eye of the user when the user is focusing at a second known depth of field. The pupil of the left eye and the pupil of the right eye are identified 560 in the second image and a pupil position of the left eye and the pupil position of the right eye are determined 570 in the second image. A second interpupillary distance in the second image between the pupil position of the left eye in the second image and the pupil position of the right eye in the second image is calculated 580. The depth of field, i.e. the gaze convergence distance, is defined 590 as a linear function of the interpupillary distance based on the first depth of field and first interpupillary distance together with the second depth of field and the second interpupillary distance.

After defining the gaze convergence distance as a linear function of the interpupillary distance, a gaze convergence distance can be determined from a received third image of the left eye and the right eye of the user when the user is focusing at a third unknown depth of field by identifying the pupil of the left eye in the third image and the pupil of the right eye are in the third image and determining a pupil position of the left eye in the third image and the pupil position of the right eye in the first image. An interpupillary distance in the third image between the pupil position of the left eye in the third image and the pupil position of the right eye in the third image is then calculated and the gaze convergence distance is determined from the defined linear function.

Methods of calculating gaze convergence distance in an eye tracking system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media of the seventh aspect may for example be one or more non-transitory computer-readable media.

Gaze Based Object Expansion

Figure 6:
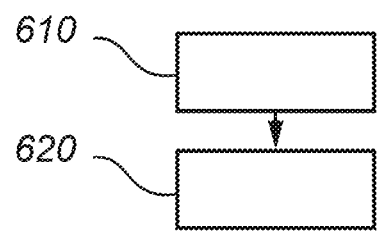
FIG. 6 is a flow chart of a method for gaze based menu expansion.

FIG. 6 is a flow chart of a method for gaze based virtual reality (VR) menu expansion in a VR system including an eye/gaze tracking function. A menu is provided 610 in VR such that only a portion of the menu is visible outside a center region of a user's view when the user's eyes are directed straight ahead, i.e. not up, down, to the right or to the left. The portion of the menu is fixed in VR space in relation to the user's head. If the user's gaze is directed to the portion of the menu, by directing the eyes towards the portion of the menu, the menu is made fixed (pinned) 620 in relation to real space such that when the users head is moved in a direction of previously not visible portions of the menu, such previously not visible portions of the menu will become visible.

The method may further include that when the complete menu is visible, the complete menu is made fixed again in VR space in relation to the user's head as long as the user's gaze is directed to the menu. On condition that the user's gaze is directed away from the menu, the view returns to only a portion of the menu being visible outside the center region of a user's view and fixed in VR space in relation to the user's head.

Figure 7A:
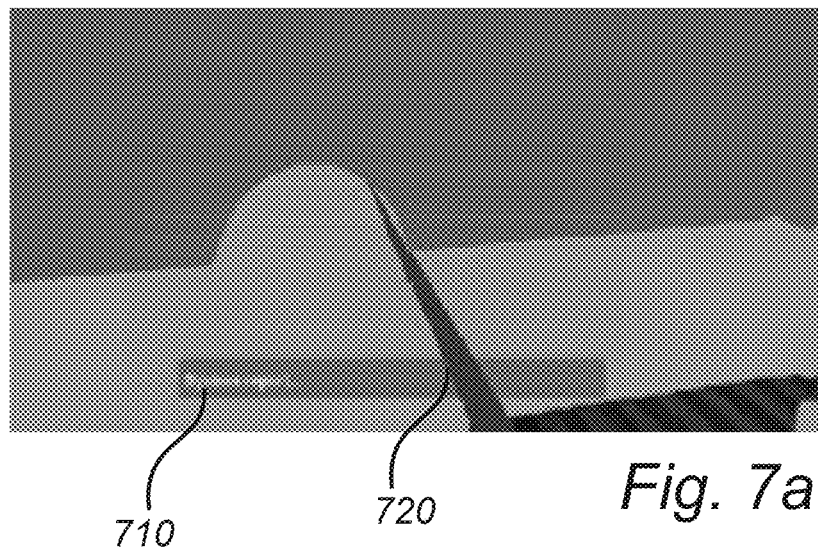
FIG. 7a-d show schematic views of an example of gaze based menu expansion.

FIG. 7a-d show schematic views of an example of gaze based menu expansion in a VR system including an eye/gaze tracking function. In FIG. 7a, a menu 710 is provided in VR such that only a portion of the menu 710 is visible below a center region of a user's view when the user's eyes are directed straight ahead, i.e. not up, down, to the right or to the left. The portion of the menu 710 is fixed in VR space in relation to the user's head, i.e. the portion of the menu 710 will be positioned at the bottom of the view of the user in VR regardless of how the user's head is turned. The users gaze direction is indicated by the pointer 720 in FIG. 7a.

Figure 7B:
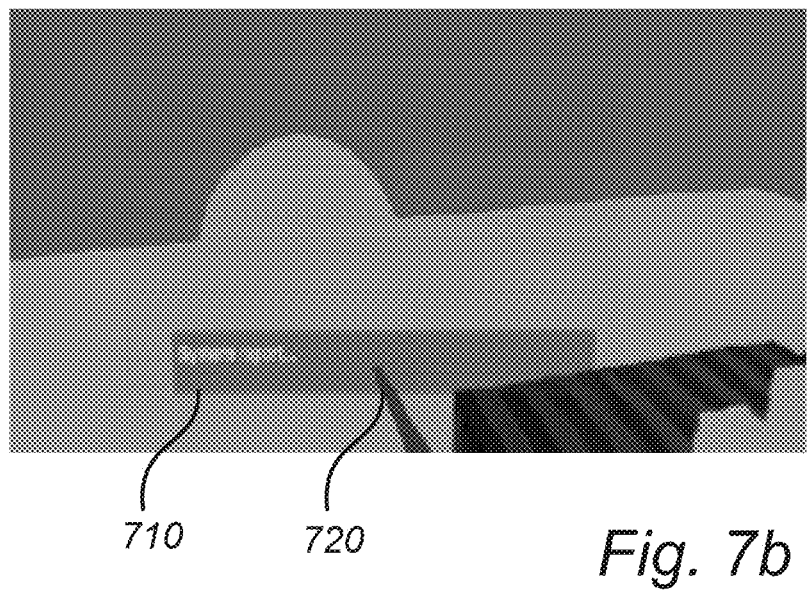

In FIG. 7b, the user's gaze direction has moved as shown by the pointer 720 to the portion of the menu 710, by directing the eyes towards the portion of the menu 710. The menu 710 is then made fixed (pinned) in relation to real space.

Figure 7C:
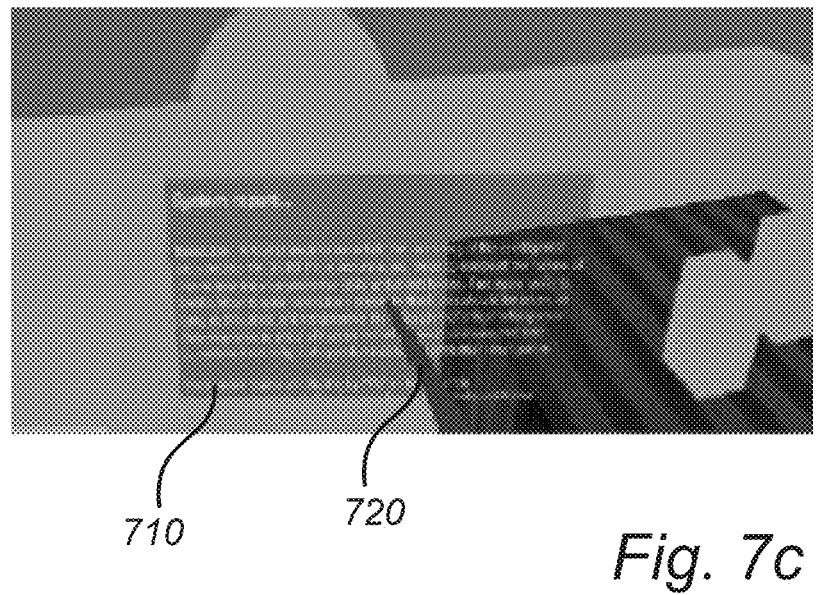

If FIG. 7c, the user's head has been directed downwards in a direction of previously not visible portions of the menu, such that these previously not visible portions of the menu 710 have become visible. The user's gaze direction as shown by the pointer 720 is still to the menu 710 but now to portions of the menu 710 previously not visible.

Figure 7D:
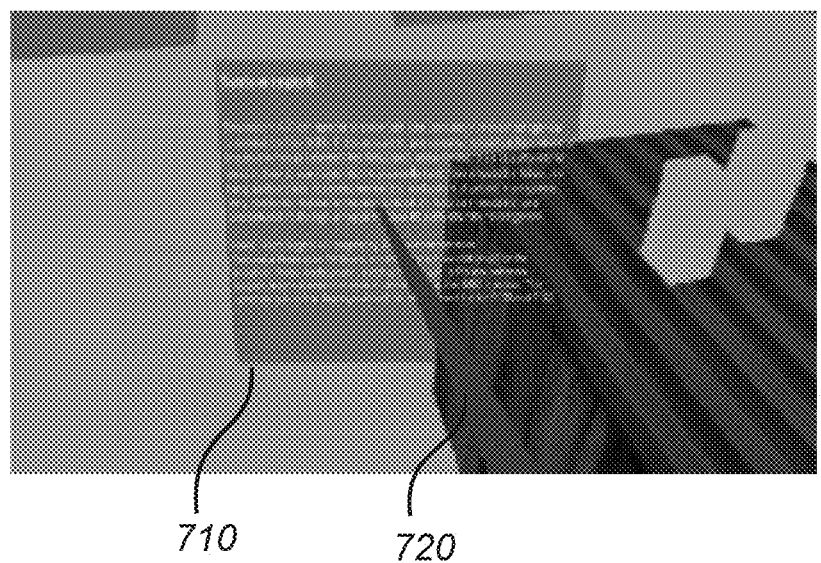

In FIG. 7d, the user's head has been directed so much downwards such that the complete menu 710 is visible. The complete menu 720 is then made fixed again in VR space in relation to the user's head as long as the user's gaze direction as indicated by the pointer 720 is to the menu 720. If the user's gaze direction is moved away from the menu 710, the view returns to only a portion of the menu 710 being visible outside the center region of a user's view and fixed in VR space in relation to the user's head as shown in FIG. 7a.

In FIG. 7a the portion of the menu is shown at the bottom of the view. It is to be noted that the portion of the menu can be fixed at either side (left or right) or at the top of the view. In such cases the complete menu can become visible by directing the view to and fixing it on the portion of the menu and turning the head in a direction such that previously not visible portions of the menu will become visible, e.g. to the left if the portion of the menu is a right hand portion of the menu or up if the portion of the menu is a lower portion of the menu.

Furthermore, is to be noted that even though a menu in VR has been described in relation to FIGS. 6 and 7a-d, the portion can be of any VR object, such that only a portion of the VR object is visible and can be made visible according to the expansion method described hereinabove.

Methods of gaze based VR menu expansion in a VR system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media of the seventh aspect may for example be one or more non-transitory computer-readable media.

FIGS. 6 and 7a-d disclose gaze based VR menu in a VR system. However, the description hereinabove in relation to VR is equally applicable for AR systems. If a AR system is used the portion of the menu 710 is fixed in a virtual space/to a virtual surface of the AR system in relation to the user's head. If the user's gaze is directed to the portion of the menu, the menu is made fixed (pinned) in the virtual space/to the virtual surface in relation to real space such that when the users head is moved in a direction of previously not visible portions of the menu, such previously not visible portions of the menu will become visible.

Methods of gaze based augmented reality (AR) menu expansion in an AR system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media of the seventh aspect may for example be one or more non-transitory computer-readable media.

Furthermore, is to be noted that even though a menu has been described in relation to FIGS. 6 and 7a-d, applications for AR can relate to any AR object, such that only a portion of the AR object is visible and can be made visible according to the expansion method described hereinabove.

The invention claimed is:

1. A method for mitigating motion sickness in a system using a head mounted display, HMD, the method comprising:
   receiving data from a sensor indicating a current orientation of the HMD in real space;
   superimposing a visual indication on a display of the HMD, which visual indication provides visual information to a user of the current orientation of the HMD in real space; and
   receiving data from a gaze tracking function indicating current gaze point of the user,
   wherein the visual indication comprises an occlusion region including the current gaze point of the user, such that the visual indication is not disclosed in the occlusion region.

2. The method of claim 1, wherein the receiving data indicating current gaze point of the user includes an approximate gaze convergence distance of a user of the HMD that is provided by:
   determining calibration data in relation to interpupillary distance between a pupil of a left eye and a pupil of a right eye of a user;
   determining, based on the determined calibration data, a gaze convergence function providing an approximate gaze convergence distance of the user based on a determined interpupillary distance of the user;
   receiving, from one or more imaging devices, one or more images of the left eye and the right eye of the user;
   determining a current interpupillary distance of the user based on the one or more images; and
   determining a current approximate gaze convergence distance based on the current interpupillary distance and the gaze convergence function.

3. The method of claim 1, wherein the visual indication has a higher degree of transparency in a region closest to the occlusion region than in regions further away from the occlusion region.

4. The method of claim 1, further comprising:
   determining, over a period of time, a largest angle difference between a vertical direction of the HMD in real space and a vertical direction of the user's visual impressions; and
   on condition that the determined angle difference is larger than a predetermined threshold value, decreasing the size of the occlusion region.

5. The method of claim 1, further comprising:
   determining, over a period of time, a largest angle difference between a vertical direction of the HMD in real space and a vertical direction of the user's visual impressions; and
   on condition that the determined angle difference is larger than a predetermined threshold value, decreasing the transparency of the visual indication.

6. The method of claim 1, wherein the visual indication indicates a horizontal surface in relation to real space.

7. The method of claim 6, wherein the visual indication further indicates a perspective in relation to real space.

8. The method of claim 1, wherein the visual indication comprises a grid pattern.

9. The method of claim 1, wherein the visual indication comprises an augmented horizontal line.

10. An apparatus comprising circuitry configured to perform the method of claim 1.

11. An apparatus for mitigating motion sickness in a system using a head mounted display, HMD, comprising:
    a receiver for receiving data from a sensor indicating a current orientation of the HMD in real space; and
    processing circuitry for superimposing a visual indication on a display of the HMD, which visual indication provides visual information to a user of the current orientation of the HMD in real space; and
    wherein the receiver is further for receiving data from a gaze tracking function indicating current gaze point of the user, and wherein the visual indication comprises an occlusion region including the current gaze point of the user, such that the visual indication is not disclosed in the occlusion region.

12. One or more non-transitory computer-readable storage media storing computer-executable instructions that, when executed by an apparatus, cause the apparatus perform of:
    receiving data from a sensor indicating a current orientation of the HMD in real space;
    superimposing a visual indication on a display of the HMD, which visual indication provides visual information to a user of the current orientation of the HMD in real space; and
    receiving data from a gaze tracking function indicating current gaze point of the user, wherein the visual indication comprises an occlusion region including the current gaze point of the user, such that the visual indication is not disclosed in the occlusion region.

* * * * *